(12) United States Patent
Kurematsu et al.

(10) Patent No.: US 8,939,856 B2
(45) Date of Patent: Jan. 27, 2015

(54) HYDRAULIC TENSIONER

(75) Inventors: Yuji Kurematsu, Nakanoshima (JP);
Osamu Yoshida, Nakanoshima (JP);
Munehiro Maeda, Nakanoshima (JP);
Akira Ishii, Nakanoshima (JP)

(73) Assignee: Tsubakimoto Chain Co., Osaka (JP)

(*) Notice: Subject to any disclaimer, the term of this patent is extended or adjusted under 35 U.S.C. 154(b) by 316 days.

(21) Appl. No.: 13/456,943

(22) Filed: Apr. 26, 2012

(65) Prior Publication Data
US 2013/0288836 A1    Oct. 31, 2013

(51) Int. Cl.
*F16H 7/08*    (2006.01)

(52) U.S. Cl.
USPC ............................................. 474/110; 474/101

(58) Field of Classification Search
CPC ................. F16H 7/08; F16H 2007/08; F16H 2007/0802; F16H 2007/0806; F16H 2007/0808; F16H 2007/0812; F16H 2007/0814; F16H 2007/0817; F16H 2007/0853; F16H 2007/0859; F16H 2007/0872; F16H 2007/0874; F16H 2007/0891
USPC .......................... 474/101, 103, 104, 110, 111
See application file for complete search history.

(56) References Cited

U.S. PATENT DOCUMENTS

| 5,713,809 A * | 2/1998 | Yamamoto et al. ........... 474/110 |
| 5,879,255 A | 3/1999 | Yamamoto |
| 2010/0087285 A1 * | 4/2010 | Sato et al. ..................... 474/110 |

FOREIGN PATENT DOCUMENTS

| JP | 10026192 | 1/1998 |
| JP | 2009-014071 A | 1/2008 |
| JP | 2008-275121 A | 11/2008 |
| JP | 2010-114903 A | 7/2010 |

* cited by examiner

*Primary Examiner* — Michael Mansen
*Assistant Examiner* — Juan Campos, Jr.
(74) *Attorney, Agent, or Firm* — Howson & Howson LLP

(57) ABSTRACT

Deaeration of the high pressure oil chamber of a hydraulic tensioner takes place though a helical orifice formed by opposed flanks of the threads of a threaded hole in the tensioner housing and the threads of a screw inserted into the hole. The opposed flanks are maintained in spaced relationship by a force exerted by a spring washer disposed between the head of the screw and a surface of the tensioner housing surrounding the opening of the threaded hole. The flank of the thread of the hole that forms part of the boundary of the helical orifice can have a concave curvature in order to increase the aperture of the air flow path. A groove in the surface surrounding the opening of the threaded hole prevents the washer from sealing off the flow of air. This groove is disposed with its exit end at a level above its entry end.

4 Claims, 8 Drawing Sheets

161C

HYDRAULIC TENSIONER

FIELD OF THE INVENTION

This invention relates to a hydraulic tensioner that applies tension to a timing chain in an engine.

BACKGROUND OF THE INVENTION

A hydraulic tensioner applies tension to a timing chain by a plunger that slides in, and protrudes from, a plunger-receiving hole in a tensioner housing, and that, with the housing, forms a high-pressure oil chamber. Oil is introduced under pressure into the high-pressure oil chamber from outside the housing, and the plunger is urged in the protruding direction both by a spring and by hydraulic pressure. An example of a hydraulic tensioner is described in U.S. Pat. No. 5,879,255, granted Mar. 9, 1999.

The tensioner comprises a housing, a cylindrical chamber formed within the housing, a plunger movable axially in the cylindrical chamber, a spring urging the plunger in a protruding direction, a high-pressure oil chamber formed behind the plunger, a oil passage communicating with the high-pressure oil chamber, and a check valve for closing the oil passage when the pressure within the high-pressure oil chamber becomes higher than the oil supply pressure. An air bleeding orifice is provided in the housing for communication between the high-pressure oil chamber and the exterior of the housing. The air bleeding orifice can be formed by a threaded hole in the housing 1, and a screw threaded into the threaded hole. In such a case, both flanks of the screw threads engage flanks of the threads of the threaded hole, and the air bleeding orifice is composed of a microscopic helical clearance formed between the ridges of the threads of the threaded hole and the bottoms of the mating threads of the screw.

When air is present in the high-pressure oil chamber of a hydraulic chain tensioner at the time the engine is started, the compressibility of the air allows the timing chain to generate flapping noises. The prior art chain tensioner described above is unable to bleed air from high-pressure oil chamber reliably through the microscopic helical thread clearance, and is therefore unable to eliminate the generation of flapping noises.

The washer interposed between the head of the screw and a surface of the housing is a split lockwasher having a radial gap that serves as an air passage. However, it is difficult to set the gap when inserting the screw. Therefore the tensioner is unable to regulate the bleeding of air from the high-pressure oil chamber. In addition, because of the presence of the gap, the spring may not exert sufficient force to lock the screw adequately.

SUMMARY OF THE INVENTION

Accordingly, the invention aims at solving the aforementioned prior art problems by providing a hydraulic tensioner that is capable of quickly and smoothly bleeding air from the high-pressure oil chamber, preventing the oil damping force from dropping due to the compressibility of air accumulated in the high pressure oil chamber, and controlling the tension in a chain while preventing the chain from generating flapping noises.

The chain tensioner comprises a housing in which a plunger-accommodating hole is formed. The plunger accommodating hole has a bottom at one end and an opening at the opposite end. A plunger having a hollow interior is slidable in the plunger-accommodating hole and protrudes therefrom through the opening in order to maintain tension in a traveling transmission chain. A high-pressure oil chamber is formed by the housing and the hollow interior of the plunger, and a check valve unit is arranged to allow oil to flow into the high pressure oil chamber while blocking reverse flow of oil. A plunger-biasing spring within the high-pressure oil chamber urges the plunger in the protruding direction. A deaeration mechanism adjacent the bottom of the plunger-accommodating hole is provided to bleed air from the high-pressure oil chamber to the exterior of the housing. The deaeration mechanism comprises a threaded hole formed in the housing and having an outer end opening in an outer surface of the housing and an inner end opening in the high pressure oil chamber. The threads of the hole have an axially outward facing flank and an axially inward facing flank. A deaeration regulating screw is threaded into the threaded hole. The threads of the screw also have an axially outward facing flank and an axially inward facing flank. A deaeration regulating washer is positioned against a part of the outer surface of the housing surrounding the outer end opening of the threaded hole. The deaeration regulating washer is a spring washer arranged to exert a force urging the screw in an outward direction from the threaded hole. A helical orifice providing fluid communication between the high pressure oil chamber and the exterior of the housing is formed by a clearance between the axially inward facing flank of the screw threads and the axially outward facing flank of the threads of the threaded hole. A deaeration guide, groove formed in the part of the outer surface of the housing surrounding the outer end opening of the threaded hole, provides a path for the flow of air, bled from the high pressure oil chamber through the helical orifice, past the washer to the exterior of the housing.

In cooperation with the threaded hole, the deaeration regulating screw regulates the bleeding of air from the high-pressure oil chamber. The deaeration guide groove prevents the path of flow of air from being sealed by the washer. Consequently, it is possible to bleed air quickly and smoothly from the high-pressure oil chamber on starting an engine, and to prevent flapping noises from being generated by a traveling chain as a result of dropping of the damping force of the tensioner due to accumulation of air in the high pressure oil chamber.

In accordance with a second aspect of the invention, the deaeration regulating washer exerts an outward force against the head of the deaeration regulating screw, thereby preventing the screw from rotating, and maintaining the helical orifice in an open condition. The axial force exerted on the screw by the deaeration regulating washer maintains a stable and secure clearance between the axially outward facing flank of the threads of the threaded hole and the axially inward facing flank of the threads of the deaeration regulating screw, so that air can flow smoothly through the helical orifice.

In accordance with a third aspect of the invention, the deaeration guide groove has an inner end meeting the outer end opening of the threaded hole and an outer end located radially outward from the inner end, and the tensioner is disposed so that the inner end of the deaeration guide groove is located at a level below the level of the outer end thereof. When the tensioner is disposed so that the outer end of the deaeration guide groove is above the inner end, discharge of air from the high-pressure oil chamber through the helical orifice and the deaeration guide groove can take place more smoothly.

According to a fourth aspect of the invention, the axially outward facing flank of the threads of the threaded hole can have a concave curved surface extending substantially from the ridge of the threads to radially outermost parts thereof.

The concave curvature of the flank surface results in a wider helical orifice, so that air from within the high-pressure oil chamber flows more smoothly through the helical orifice, improving the rate of deaeration of the high-pressure oil chamber.

DETAILED DESCRIPTION OF THE PREFERRED EMBODIMENTS

Figure 1:
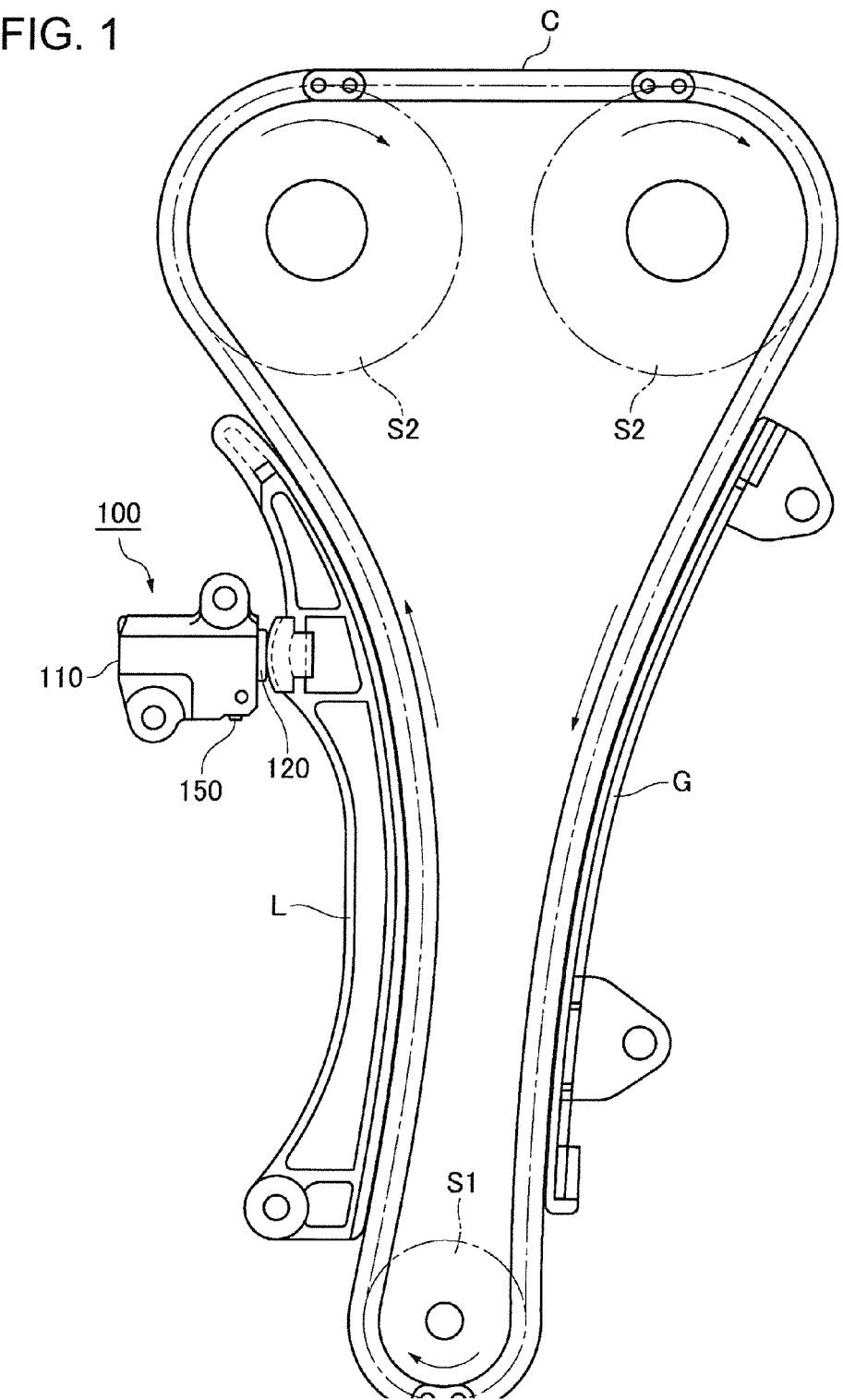
FIG. 1 is a schematic front elevational view of a timing drive incorporating a tensioner according to the invention.
Figure 2A:
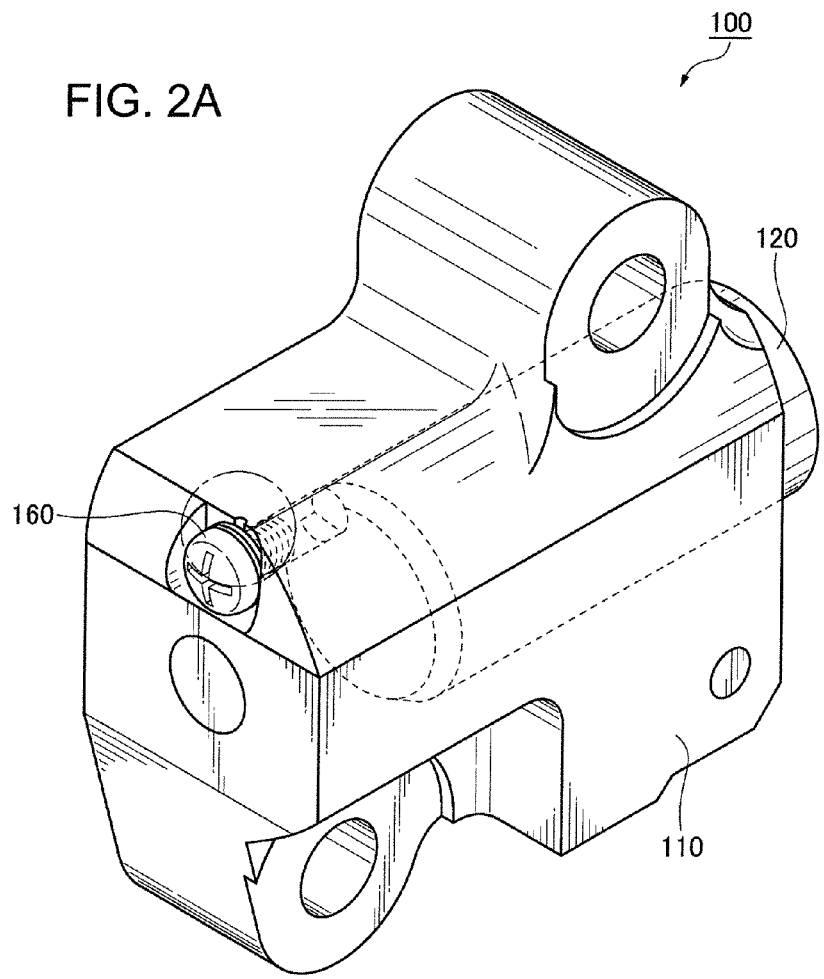
FIG. 2A is a perspective view of the hydraulic tensioner shown in FIG. 1.
Figure 2B:
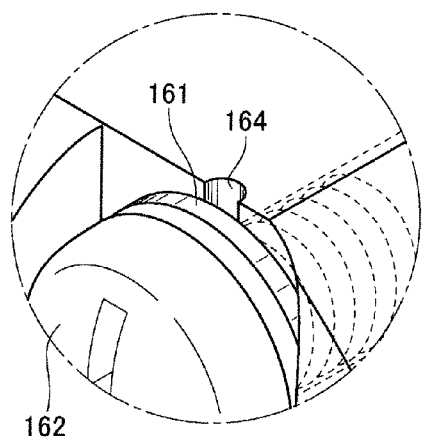
FIG. 2B is an enlarged view of a part of the hydraulic tensioner shown in a broken line circle in FIG. 2A.

FIG. 1 shows the timing drive of a dual overhead cam (DOHC) internal combustion engine in which an endless timing chain C is driven by a crankshaft sprocket S1 and drives a pair of camshaft sprockets S2. Arrows show the directions of sprocket rotation and chain travel. A hydraulic tensioner 100 is located adjacent the slack side of a timing chain C, i.e., the span of the chain that travels from the crankshaft sprocket 51 toward one of camshaft sprockets S2. A plunger 120 protrudes from the housing 110 of the tensioner to apply tension to the slack side of the timing chain through a pivoted lever L. The tensioner housing and lever L can be mounted on the engine block (not shown). A stationary guide G guides a travel of the tension side of the timing chain, i.e., the span that travels from a camshaft sprocket S2 toward the crankshaft sprocket S1.

Figure 3:
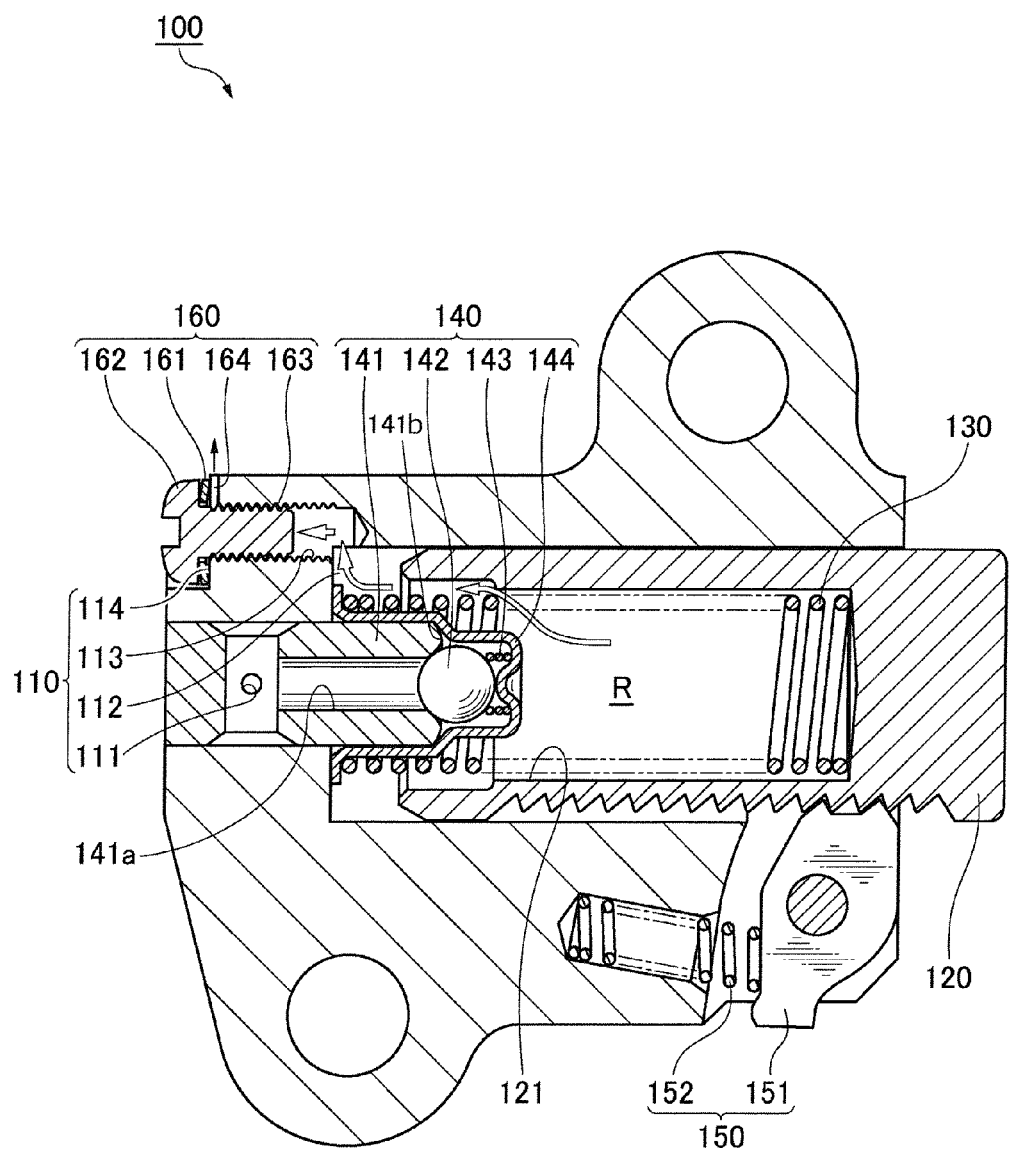
FIG. 3 is a cross-sectional view of the hydraulic tensioner of FIG. 1.

As shown in FIG. 3, an oil supply passage 111 formed in the housing 110 for introduction of oil supplied under pressure from the engine block or from another source. A plunger-accommodating hole 112 is formed in the housing 110. The plunger 120 is slidable in, and protrudes from the plunger-accommodating hole 112. The plunger 120 has a hollow, cylindrical, interior 121 which, which the plunger-accommodating hole 112, forms a high-pressure oil chamber R. A plunger-biasing spring 130 within the high-pressure oil chamber R urges the plunger 120 in the protruding direction. A check valve unit 140, incorporated at the bottom of the plunger-accommodating hole, i.e., at the end of the plunger-accommodating hole 112 opposite from the opening through which the plunger protrudes, blocks reverse flow of the oil from the high-pressure oil chamber R to the oil supply passage 111. A ratchet mechanism 150 includes a pawl 151 biased by a ratchet-biasing spring 152 so that teeth of the pawl are urged into engagement with rack teeth formed on the exterior of the plunger 120.

The check valve unit 140 comprises a tubular element 141 having a ball seat 141b formed at one end. An internal passage 141a of the tubular element communicates with the oil supply passage 111 in the housing 110. A check ball 142 is urged against the seat 141b by a ball-biasing spring 143, and a ball retainer 144 supports the ball-biasing spring 143 and restricts movement of the check ball 142. The specific check valve unit described above and shown in FIG. 3 is only one of many check valve units suitable for use in the tensioner of this invention.

Because air can become mixed with the oil in the high-pressure oil chamber R, and the air, because of its compressibility, can interfere with proper operation of the tensioner, a deaeration mechanism 160 is provided near the bottom of the plunger-accommodating hole 112 to bleed air from the high pressure oil chamber to the outside of the housing 110.

The deaeration mechanism 160, which is shown in FIGS. 2A, 2B, 4A and 4B, comprises a threaded hole 113 in the housing 110. Hole 113 communicates with the plunger-accommodating hole 112. A deaeration regulating screw 162 is threaded into hole 113, and a deaeration regulating washer 161, in the form of a resilient annular, domed, spring washer, is provided between the head 162b of the screw and a surface 114 of the housing surrounding the opening at the outer end of hole 113. The spring force exerted by the washer 161 urges the screw in a direction such that the axially inward facing flanks 162a of its screw threads are urged away from the axially outward facing flanks 113a of the threads in hole 113, forming a clearance 163 in the form of a helical orifice through which air can bleed from the high pressure oil chamber to the exterior of the housing through a radial deaeration guide groove 164 provided in housing surface 114 to prevent the air path from being sealed by the spring washer.

The helical orifice 163 is maintained because of the axial force exerted by the washer 161 that urges the outward-facing flanks of the screw into engagement with the inward-facing flanks of the threads in hole 113. The faces of the threads are straight in cross-section, and part of the helical orifice is defined between parallel, uniformly spaced, faces of the axially outward facing flanks 113a of the threads of hole 113 and the axially inward facing flanks 162a of the screw threads. The uniform spacing between the thread faces provides for smooth flow of air from the high-pressure oil chamber R through the helical orifice 163.

The deaeration guide groove 164 is preferably disposed so that the point at which air enters the guide groove is located at a level below the level at which the exit end of the guide groove is located. Air flows upward through the guide groove from the helical orifice to the outside of the tensioner, and reverse flow of air can be avoided. Preferably the deaeration guide groove is configured so that flow of air through the groove proceeds continuously in an upward direction.

Figure 4A:
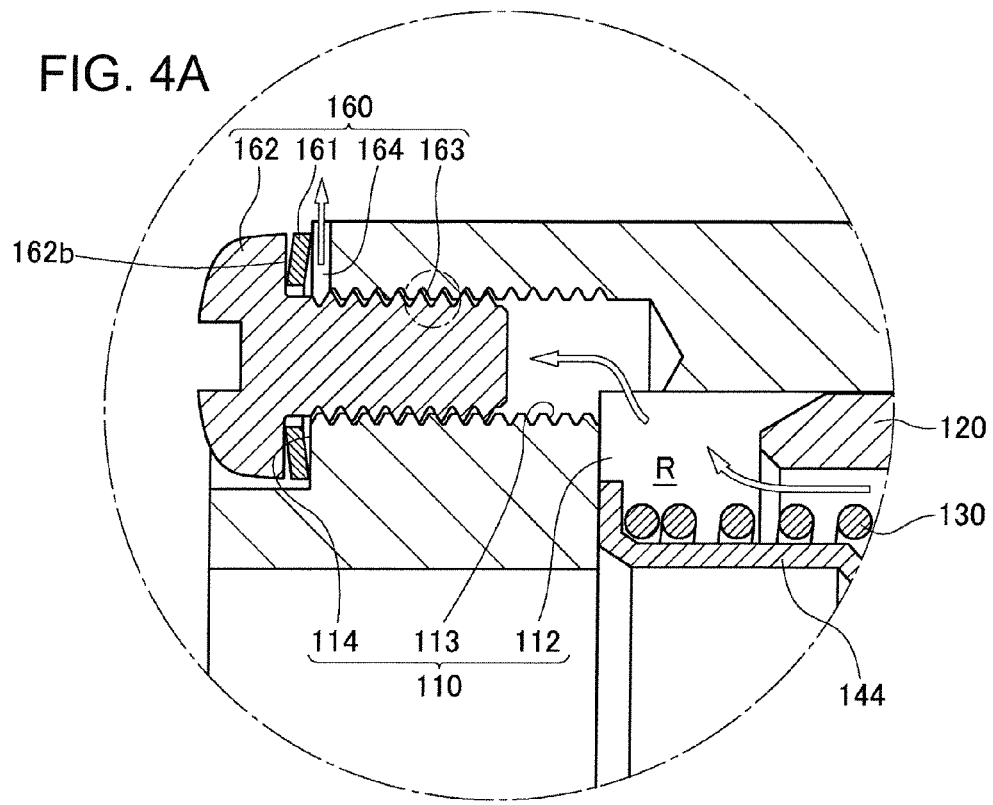
FIG. 4A is a cross-sectional view showing details of a deaeration mechanism of the tensioner.
Figure 4B:
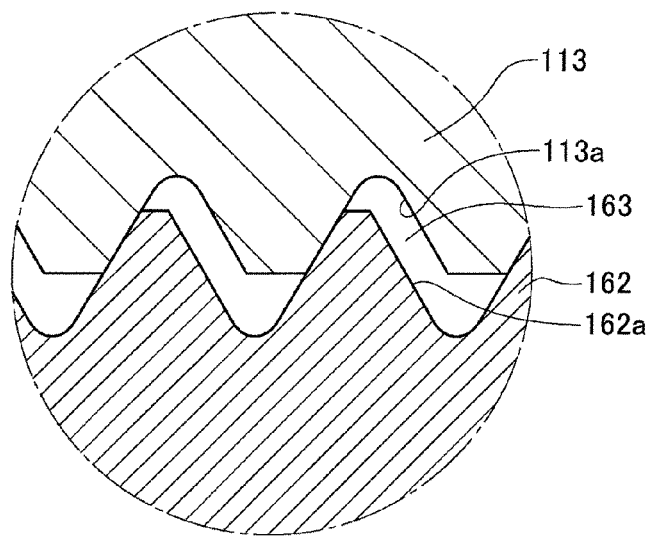
FIG. 4B is an enlargement of a part of the deaeration mechanism shown in a broken line circle in FIG. 4A.
Figure 5:
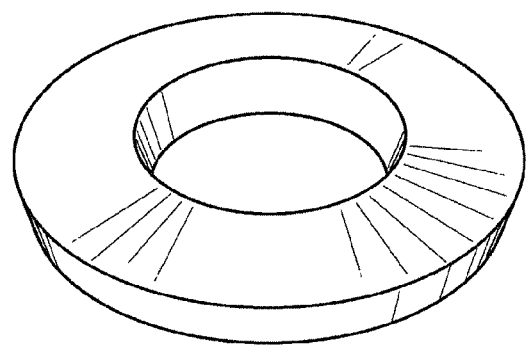
FIG. 5 is a perspective view of a washer used in the deaeration mechanism.

As shown in FIG. 4a, screw 162 can be a commercially available, general-purpose, pan-head screw having a substantially triangular thread ridge. Thus the cost of the deaeration mechanism can be kept low.

Figure 6:
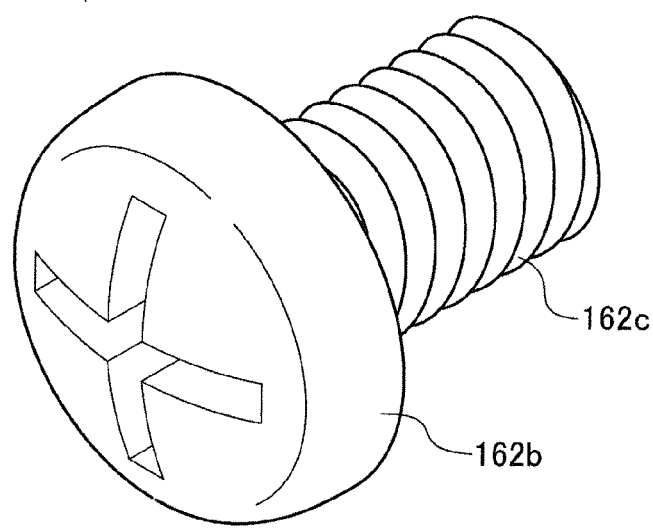
FIG. 6 is a perspective view of a regulating screw used in the deaeration mechanism.
Figure 7:
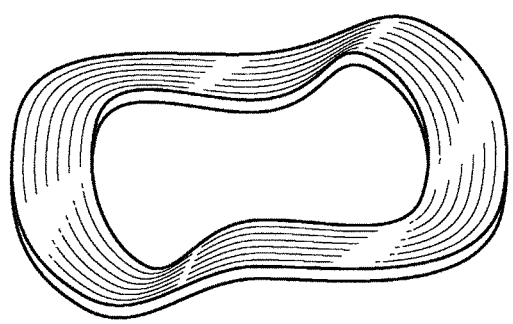
FIG. 7 is a perspective view of an alternative washer used in the deaeration mechanism.
Figure 8:
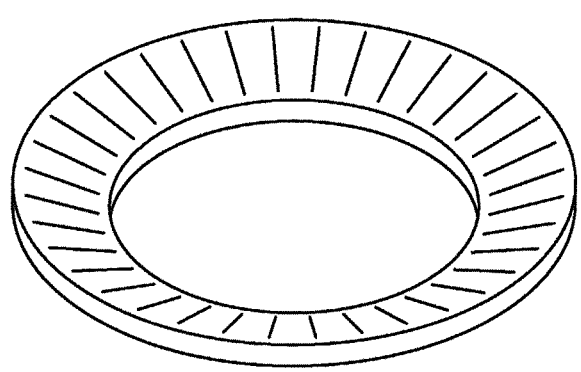
FIG. 8 is a perspective view of another alternative washer used in the deaeration mechanism.
Figure 9:
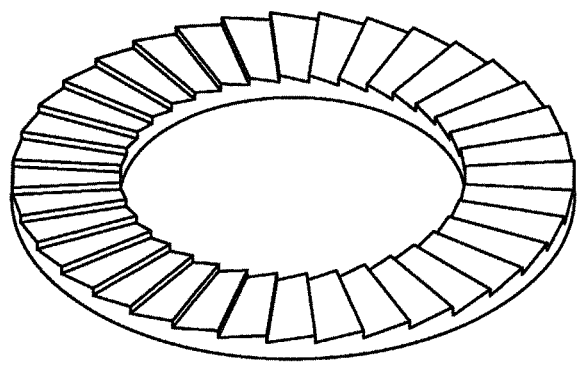
FIG. 9 is a perspective view of still another deaeration mechanism.

Deaeration regulating washers 161A, 161B and 161C, shown in FIGS. 7 through 9, are examples of modified versions of the deaeration regulating washer 161. Each of these washers can be fitted between the head 162b of the screw 162 and the surface 114 of the housing surrounding the hole 113, and exerts a force urging the screw outward from the hole 113. FIG. 7 shows a waved spring washer 161A. FIG. 8 shows a disc-shaped spring washer 161B. FIG. 9 shows a toothed spring washer 161C. All of these bring about an effect similar to that of the domed deaeration spring washer 161 shown in FIG. 6.

In the hydraulic tensioner 100, the deaeration mechanism 160 comprises a helical orifice 163 a part of which is formed by a clearance between flank 113a of the threaded hole 113 and the parallel flank 162a of screw 162, and by the groove 164 in surface 114 of housing 110. This structure of the deaeration mechanism makes it possible to regulate the bleeding of air from high-pressure oil chamber R by turning the deaeration regulating screw 162 to thereby maintain damping of the movement of the plunger sufficient to prevent the generation of flapping noises by the traveling transmission chain. It is possible to regulate deaeration by selecting a screw having an appropriate axial length, and thereby select the length of the helical orifice. It is also possible to achieve fine adjustment of the length of the helical orifice by turning the screw.

Because the washer 161 is located adjacent the head 162b of the screw 162, the clearance forming the helical orifice 163 between flank 113a of the threaded hole 113 and flank 162a of the screw 162 is maintained by the axial force exerted by the washer in the direction of the screw axis. Because the clearance is maintained, air in the high-pressure chamber R flows smoothly through the helical orifice 163.

Because the end of the deaeration guide groove 164 that receives air from the helical orifice 163 is disposed below the exit end of the guide groove 164, it is possible to discharge air from the high-pressure oil chamber R reliably even if the tensioner 100 is installed In such a way that its plunger protrudes at an angle upward or downward.

Figure 10A:
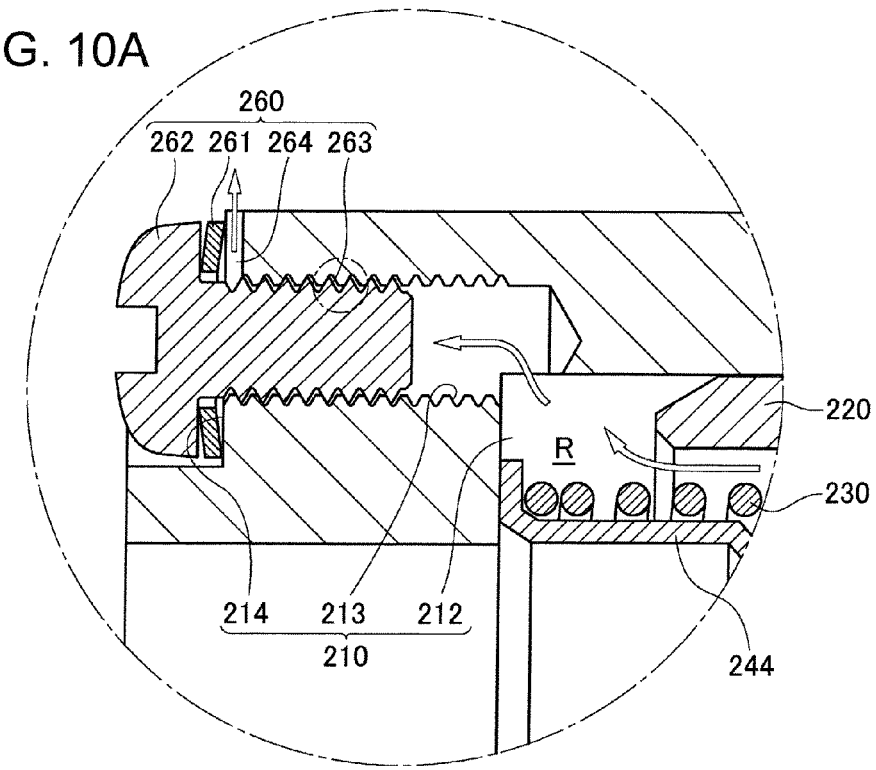
FIG. 10A is a cross-sectional view showing details of a deaeration mechanism of the tensioner according to an alternative embodiment of the invention.
Figure 10B:
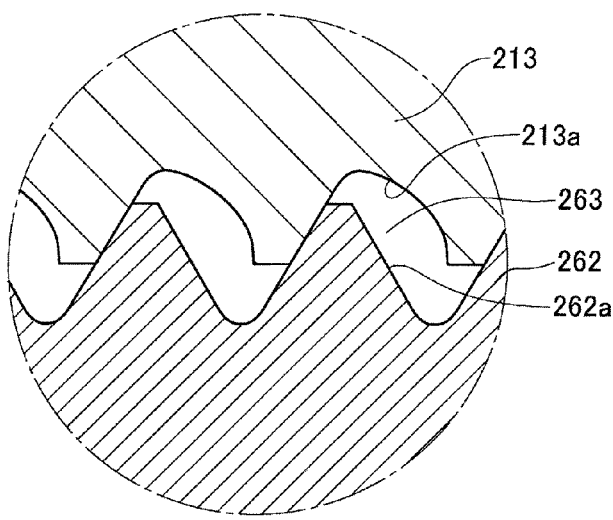
FIG. 10B is an enlargement of a part of the deaeration mechanism shown in a broken line circle in FIG. 10A.

In the alternative embodiment illustrated in FIGS. 10A and 10B, the configuration of the helical orifice is different from that in the previously described embodiment, but the tensioner is otherwise the same. Parts are identified by reference numerals that exceed by 100 the reference numerals for corresponding parts in the previously described embodiment.

As shown in FIG. 10B, the helical orifice 263 is formed by a clearance between axially inward facing flanks 262a of the screw threads and the opposed axially outward facing flanks 213a of threaded hole 213. A deaeration guide groove 164 (FIG. 10A), through which air flows from the helical orifice to the outside of the housing is provided in surface 214 of the housing, which is contacted by washer 261.

As in the previously described embodiment, the axial force exerted by the washer on the head of the screw maintains the outward facing flanks of the screw in contact with inward facing flanks of the hole and thereby maintains the helical orifice in an open condition. The groove 261 prevents the helical orifice 263 from being sealed by the deaeration regulating washer 261.

The axially outward facing flank 213a of the threads of the hole 213 has a concave curvature extending from the ridge of the threads to radially outermost parts thereof. On the other hand, the axially inward facing flanks 262a of the screw 262 are flat. The concavity of the radially outward flanks 213a increases the size of the helical orifice 263 for smoother and more rapid flow of air from the high-pressure oil chamber R.

As in the previously described embodiment, the deaeration mechanism in the embodiment shown in FIGS. 10A and 10B makes it possible to regulate the bleeding of air from high-pressure oil chamber R by turning the deaeration regulating screw 262 and thereby maintain damping of the movement of the plunger sufficient to prevent the generation of flapping noises by the traveling transmission chain on starting of the engine. Moreover, as in the previously described embodiment, the washer 261 maintains the clearance forming the helical orifice 263, and secures the screw against rotation.

Many variations of the tensioner can be adopted which still use the deaeration mechanism of the invention. For example, the deaeration mechanism can be utilized in ratchet tensioners having various different kinds of ratchet mechanisms, in tensioners having oil reservoirs, and in tensioners having check valves that are situated at a position other than at the bottom of the plunger-accommodating hole of the tensioner housing.

The specific configuration of the deaeration regulating screw used in the deaeration mechanism may vary as long as the screw has a head such as a round-head, pan-head, round-flat head, disc-head, oval counter-sunk head. The screw threads can also have any of a variety of ridge configurations, such as triangular, trapezoidal and round ridges. It is of course possible to reduce costs by adopting general-purpose screws.

The hole into which the deaeration regulating screw is threaded may have any of various thread configurations as long as helical orifice is formed by a clearance between the axially outward facing flanks of the threaded hole and the axially inward facing flanks of the screw.

The deaeration regulating washer can be any spring washer as long as the washer is fitted adjacent to the head of the deaeration regulating screw, locks the screw against rotation, exerts a force against the head of the screw urging screw in the outward direction from the threaded hole. Thus, a disc-type, internal tooth-type, external tooth-type or internal and external tooth-type washer can be used. On the other hand, a flat washer is unable to exert the outward force against the head of the screw. The deaeration regulating washer is preferably a spring washer having no radial cut away portion forming a gap.

What is claimed is:

1. A chain tensioner comprising:
a housing;
a plunger-accommodating hole formed in the housing, the plunger accommodating hole having a bottom at one end thereof and an opening at an end thereof opposite from said bottom;
a plunger having a hollow interior, the plunger being slidable in the plunger-accommodating hole, along a plunger-accommodating hole axis, and protruding from said plunger-accommodating hole through said opening for maintaining tension in a traveling transmission chain;
a high-pressure oil chamber formed by the housing and the hollow interior of the plunger;
a check valve unit arranged to allow oil to flow into the high pressure oil chamber while blocking reverse flow of oil from the high-pressure oil chamber;
a plunger-biasing spring within the high-pressure oil chamber urging the plunger in a protruding direction; and
a deaeration mechanism provided adjacent the bottom of the plunger-accommodating hole for bleeding air from the high-pressure oil chamber to the exterior of the housing;
the deaeration mechanism comprising;
a threaded hole formed in the housing, said threaded hole having an outer end opening in an outer surface of the housing and an inner end opening in the high pressure oil chamber, and extending from said outer end opening to said inner end opening along a hole axis parallel to said plunger-accommodating hole axis, the threads of the hole having an axially outward facing flank and an axially inward facing flank;

a deaeration regulating screw having a head and being threaded into the threaded hole, the screw also having threads with an axially outward facing flank and an axially inward facing flank; and a deaeration regulating washer positioned against a part of said outer surface of the housing surrounding said outer end opening of the threaded hole;

wherein the deaeration regulating washer is a spring washer arranged to exert a force on the screw urging the screw in an outward direction from said threaded hole;

wherein a helical orifice providing fluid communication between the high pressure oil chamber and the exterior of the housing is formed by a clearance between the axially inward facing flank of the screw threads and the axially outward facing flank of the threads of the threaded hole; and wherein a deaeration guide groove is formed in said part of said outer surface of the housing surrounding the outer end opening of the threaded hole, said deaeration guide groove extending from an air-receiving end at which the deaeration guide groove meets said helical orifice to an air exit end remote from said helical orifice, said air exit end being disposed at a level above the level of said air-receiving end, and said deaeration guide groove providing a path for the flow of air, bled from the high pressure oil chamber through the helical orifice, past the washer to the exterior of the housing.

2. The hydraulic tensioner according to claim 1, wherein the deaeration regulating washer exerts an outward force against the head of the deaeration regulating screw, thereby preventing the screw from rotating and maintaining said helical orifice in an open condition.

3. The hydraulic tensioner according to claim 1, wherein the deaeration guide groove has an inner end meeting the outer end opening of the threaded hole and an outer end located radially outward from the inner end, the tensioner being disposed so that the inner end of the deaeration guide groove is located at a level below the level of the outer end thereof.

4. The hydraulic tensioner according to claim 1, wherein the axially outward facing flank of the threads of the threaded hole have a ridge constituting a radially innermost part of said threads of the threaded hole, and a groove bottom constituting a radially outermost part of said threads of the threaded hole, and wherein a flank of said threads of the threaded hole facing toward the air entry end of said threaded hole has a concave curved profile in axial section, said concave curved profile extending substantially from the said ridge of the threads of said threads of the threaded hole to said radially outermost part of said threads of the threaded hole.

* * * * *